No. 657,567. Patented Sept. 11, 1900.
A. W. ROBINSON.
SUCTION PIPE FOR DREDGES.
(Application filed Dec. 8, 1899.)
(No Model.) 2 Sheets—Sheet 1.
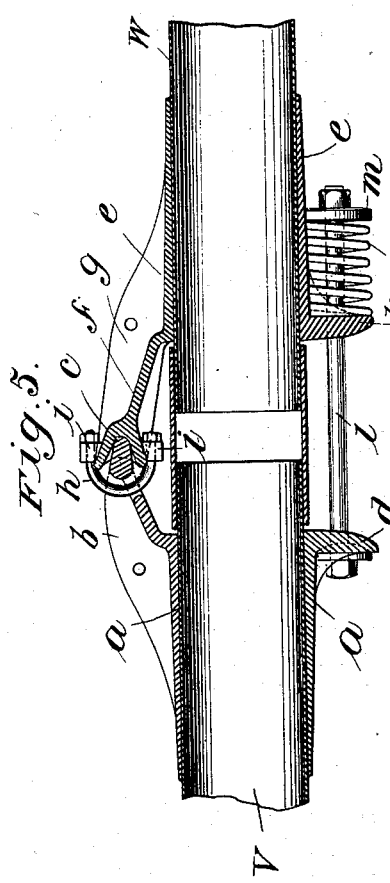
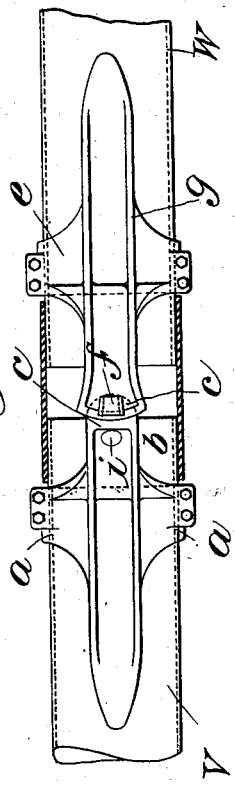
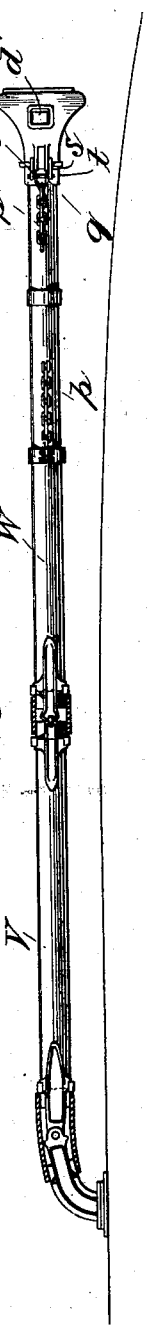
Witnesses
Edward Rowland.
Edgar R. Mead.
Inventor
Arthur W. Robinson
By his Attorney Phillips Abbott No. 657,567. Patented Sept. 11, 1900.
A. W. ROBINSON.
SUCTION PIPE FOR DREDGES.
(Application filed Dec. 8, 1899.)
(No Model.) 2 Sheets—Sheet 2.
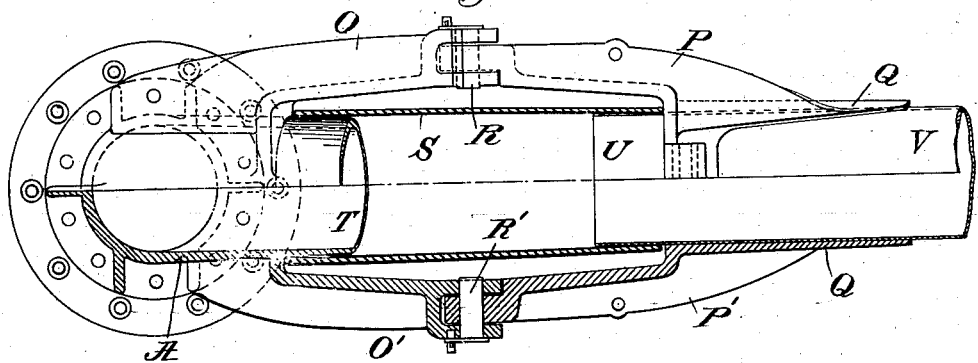
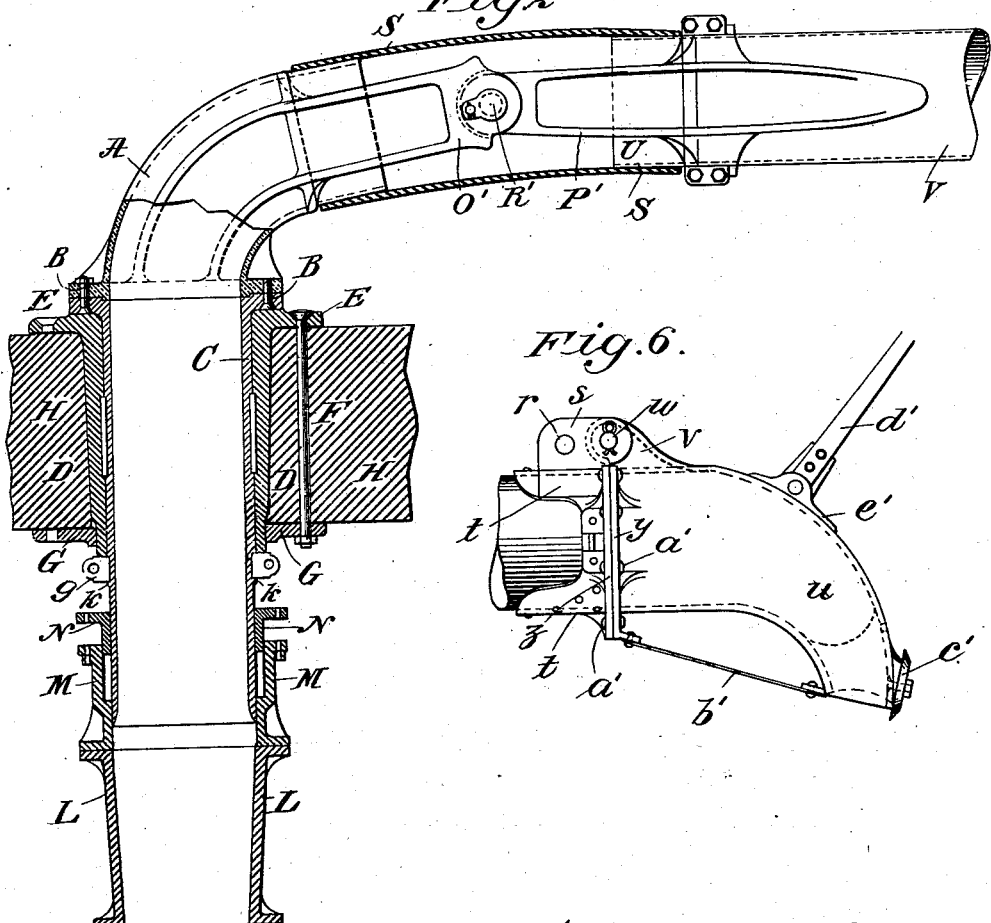

UNITED STATES PATENT OFFICE.

ARTHUR W. ROBINSON, OF MILWAUKEE, WISCONSIN.

SUCTION-PIPE FOR DREDGES.

SPECIFICATION forming part of Letters Patent No. 657,567, dated September 11, 1900.

Application filed December 8, 1899. Serial No. 739,619. (No model.)

*To all whom it may concern:*

Be it known that I, ARTHUR W. ROBINSON, a citizen of the Dominion of Canada, and a resident of Milwaukee, in the county of Milwaukee and State of Wisconsin, have invented certain new and useful Improvements in Suction-Pipes for Dredges, of which the following is a description, reference being had to the accompanying drawings, in which—

Figure 1 is a plan view of the suction-pipe shown attached to a vessel, the sides of which are indicated by a single line. Fig. 2 is a plan view, partly in section, showing the socket whereby the suction-pipe is attached to the sides of the vessel. Fig. 3 is a detail of the upper flexible joint. Fig. 4 is a detail in plan of the central flexible joint. Fig. 5 is an elevation in section, on the medial line of the suction tubing, of the central flexible section as shown in Fig. 4. Fig. 6 is a detail in elevation of the drag at the lower end of the pipe.

The invention relates to that type of hydraulic dredges employed in the deepening of ocean bars or river-ways in which the dredges ordinarily have compartments or tanks within themselves to contain the dredged material, which is lifted from the bottom to them by means of a suction-pipe, on the end of which is a drag which moves along upon the bottom as the vessel is propelled, powerful suction-pumps on the dredge being meantime operated, whereby a column of water of large volume is forcibly drawn upwardly through the suction-pipe into the dredge, carrying with it the material removed from the bottom. The pump discharges the material into the tank or tanks within the vessel, in which the solid matter settles to the bottom and the more fluid portion after settlement is allowed to escape overboard. After the tanks or compartments within the dredge are filled with comparatively-solid material the drag and suction-pipe are hoisted from the bottom. The vessel is then propelled to a suitable place, either out at sea or at some other desired point, where the material contained within its tanks is pumped overboard or otherwise discharged.

The suction-pipe which constitutes the subject-matter of this invention extends from the side of the vessel to the bottom, and, as before stated, drags upon it as the dredge is slowly propelled. Since these dredges are usually employed in the open sea or upon large bodies of water, they almost always encounter considerable sea at the time of their use. It is therefore necessary to provide suitable flexibility in the suction-pipe, while preserving the necessary strength and alinement in the pipe to enable it to perform its functions without injury.

The purpose of this invention is to provide a suction-pipe adapted for use under the conditions described above better than any form known heretofore, and it embodies devices whereby lateral and also vertical flexibility is provided for at two points—first, at or near its point of attachment to the dredge, and, second, at or near the middle of its length, where it is likely to be strained under the bilge of the vessel or dredge. This latter is of great importance, for when dredging the vessel is likely to drift sidewise to a considerable extent because of the tide and wind, which occasions the drag to move away from or underneath the dredge, as the case may be.

Referring now to Figs. 2 and 3, the suction-pipe is connected to the vessel by an elbow-joint A, which is bolted by bolts B to the flange of a tubular sleeve C, which fits somewhat snugly within an eye-plate D, which is provided on its outer ends with a flange E, through which pass bolts F, which engage with a plate or washer G on the inside of the vessel, whereby the eye-socket is clamped firmly in position. The side of the vessel is illustrated at H.

*g* is a split annulus or ring which rests against the inner end of the eye-socket D and engages with an annular rib *k* on the part C, so that it is permanently held in place, yet is capable of a swiveling action.

L is a tubular casting to which the discharge-pipe into the interior of the vessel is connected in suitable manner. M is another casting which acts as a stuffing-box, N being the follower for the stuffing-box, whereby leakage within the vessel is prevented.

Lateral flexibility of the suction-pipe at or near the elbow is provided by a double-hinged joint between the elbow A and the first section of the suction-pipe proper. These parts are preferably made of steel and are as follows:

Upon the sides of the elbow A are cast or forged two outwardly-projecting arms O O', which are bifurcated at their ends, as shown.

P P' are corresponding arms which are cast or forged upon a tubular section Q, and the arms P P' enter between the forks or bifurcated ends of the arms O O', where they are connected by pins R and R'. A flexible section of hose, made of rubber, canvas, or other suitable material or combination of materials, as preferred, (illustrated at S,) is passed over the projecting end of the elbow T and also over the projecting end of the first section of the suction pipe U and is suitably fastened to these projecting ends, so that as the joint moves the rubber hose will give and take, as required, maintaining always a continuous pipe for the passage of the excavated material.

V (see particularly Fig. 1) is the upper section of the suction-pipe. It is preferably made of steel, and it is connected with the lower section W by what may be called a "universal-joint" connection—that is to say, $a$ is a casting fastened upon the end of the pipe-section V in any suitable manner, as by riveting, clamping, being forced on by hydraulic pressure, or otherwise. At its upper side there is an upwardly-projecting rib $b$, composed of two side parts and a forward cross-bar $c$. (See Fig. 5.) On the under side there are two lugs $d$, which are projected laterally, so that they are about as far apart as the diameter of the pipe. On the adjacent end of the pipe-section W there is another casting $e$ $e$, provided on its upper part with a diagonally-rising web $f$, supported by lateral ribs $g$, the end of which is bifurcated, as shown, and which engages with the cross-bar $c$ upon the casting $a$. A link $h$ is bolted, as shown, to lugs $i$ $i$ on the casting $f$, which passes around the cross-bar $c$ of the casting $a$, so that oscillatory movement is permitted at this joint in all directions, while longitudinal separation is prevented.

On the under side of the casting $f$ there are lugs $k$, through which pass bolts $l$, one on each side, and on one end of these bolts there is a washer $m$, which confines a spring $n$ between it and the lugs $k$. As before stated, there is one of these bolts at each side of the pipe. It will be seen that this joint is entirely self-sustaining, the compression of the two heavy springs $n$ $n$ tending to maintain the parts in connection with each other and also to straighten the pipe in the event of its flexure in either direction. If the flexure be in vertical lines, then the tension on both of the springs is increased by the resistance of the upper joint, which is put under compression, with the obvious result of straightening the pipe the moment the excessive strain is removed. If, on the other hand, the flexure be laterally or at any intermediate angle between the vertical and horizontal, then one of the springs is put under greater tension than the other, and it exerts its power, which is very considerable, to straighten the pipe against not only the vertical, but the lateral bends. This I regard as an important feature in my invention, since it is necessary not only that there be flexibility in all directions at about the center of the pipe, but also that the flexibility shall be provided in such a way that there will be a constant tendency to return to straight lines—in other words, to the normal or central position. This is accomplished very effectively by the construction above described. The tension of the springs is adjustable by means of the nuts, as shown, to adapt the apparatus to the special work being done.

The pipe is suspended near its lower end by a sling-chain $p$, (see Fig. 1,) which connects with a bail or equivalent device $q$, pivoted upon a bolt, which passes through holes $r$, (see Fig. 6,) made in flanges $s$ on a casting $t$, which is clamped or otherwise fastened at the lower end of the suction-pipe.

The drag $u$ is or may be connected to the lower end of the suction-pipe in any suitable manner. I prefer to connect it by a hinge-joint at the upper side, whereby it is attached to the casting $t$—that is to say, between the two flanges $s$ $s$ on the lower casting fit two upwardly-projecting webs $v$, which form part of the drag, and a cross-pin $w$ acts as the pivot. The drag is provided with a flange $y$ at its base, which rests against a similar flange $z$ on the casting $t$, and these two flanges are connected together by a series of bolts $a'$ $a'$. $b'$ is a metallic plate connected with the flange $y$, which causes the drag to ride upon the bottom or material to be excavated. $c'$ $c'$ are the usual teeth constituting the cutting devices for the drag, whereby the material to be excavated is broken up. $d'$ is a device for opening a door $e'$ in the upper rear portion of the drag to provide flushing water when necessary. In this part of the apparatus is embodied another invention, which I do not here describe, since it forms the subject-matter of an additional application for Letters Patent, which I am about to file.

The operation of the apparatus as thus far described has already been fully explained. I desire, however, to make the following general explanation: The pipe as a whole during the hoisting and lowering oscillates on the swiveling elbow and coacting parts, whereby it is attached to the vessel at its upper end, and when it is in operation it has free vertical movement at three points—first, at the swiveling elbow, as above stated; second, at the arm connection adjacent to the elbow, and, third, at the universal joint about midway of its length, and it has free lateral movement at the last-named place, where flexure of the pipe under the bilge of the vessel is necessary. The joint at this place is not only universal, but, as before stated, is of such a character that the pipe automatically straightens itself irrespective of the angle at which the flexure has been made.

Although I have described my invention and illustrated it as applied to a dredge operating when in motion and provided with hoppers or puddling-tanks, it will be understood that my improvements are equally applicable to dredges used when at anchor and when loading into scows. Also the lower end of my suction-pipe is sometimes fitted with a suction-nozzle instead of a drag, and the swiveling elbow which I have described as located in the side of the vessel may be located on deck or otherwise supported, and it may be provided with a single piece of plain suction-pipe without any drag or intermediate flexibility. The purpose of the invention in this respect is to provide a strong and positive hinge connection without depending upon the suction-hose for strength or for any service other than that of merely conducting the material. In machines of this class heretofore in use a strong suction-hose was necessary, reinforced usually by sling-chains and other devices, in which the hose itself was subject to great strains and deformation. Under this my invention I practically avoid all strains upon the hose.

It will be obvious to those who are familiar with this art that modifications may be made in the details of construction of my apparatus without departing from the essentials thereof. I therefore do not limit myself to such details.

Having described my invention, I claim—

1. The combination, in a suction-pipe, of a swiveling elbow-joint connecting the pipe to the dredge, a joint adapted to horizontal movement near the elbow-joint, a universal joint about midway of the pipe, and a drag at the lower end of the pipe, for the purposes set forth.

2. The combination with other parts composing a suction-pipe, of parts attached to the exterior of the ends of the pipe-sections which constitute a universal joint and whereby the ends of the sections are maintained in proper relative positions, and a spring coacting with the parts which constitute the universal joint adapted to resist deflection of the pipe from a straight line, for the purposes set forth.

3. In a suction-pipe a universal joint embodying one point of support at one side of the pipe and two spring-actuated points of support at the other side of the pipe, for the purposes set forth.

4. In a suction-pipe a universal joint embodying a point of support on the upper side of the pipe, normally in a condition of compression, and two spring-actuated points of support at or near the lower side of the pipe, which are strained by flexure of the pipe, for the purposes set forth.

5. In a suction-pipe a joint between two adjoining sections thereof embodying terminal devices on the exterior of the ends of the sections respectively, provided with arms projecting therefrom, which arms engage with each other at about the medial line of the flexible material, a spring or springs connecting the ends of the pipe opposite said projecting arms and on the exterior thereof, which resist any flexure of the pipe, and a flexible tubular material connecting the ends of the pipe-sections, for the purposes set forth.

6. In a suction-pipe the combination of a swiveling elbow-joint located in the side of the vessel, a rigid section of the pipe connected to the elbow by a tubular piece of elastic material, arms projecting from the elbow-piece and from the pipe pivoted together and permitting movement in one direction, a universal joint about midway of the pipe connecting two rigid sections thereof by means of a single point of support on the upper side of the pipe and two spring-actuated points of support near the lower arc thereof, and a drag on the end of the pipe, for the purposes set forth.

Signed at South Milwaukee, in the county of Milwaukee and State of Wisconsin, this 17th day of October, 1899.

ARTHUR W. ROBINSON.

Witnesses:
JOSEPH G. DAVIES,
J. M. MILLMAN.